(No Model.)
O. P. HURFORD.
DRIVE CHAIN.
No. 443,769. Patented Dec. 30, 1890.
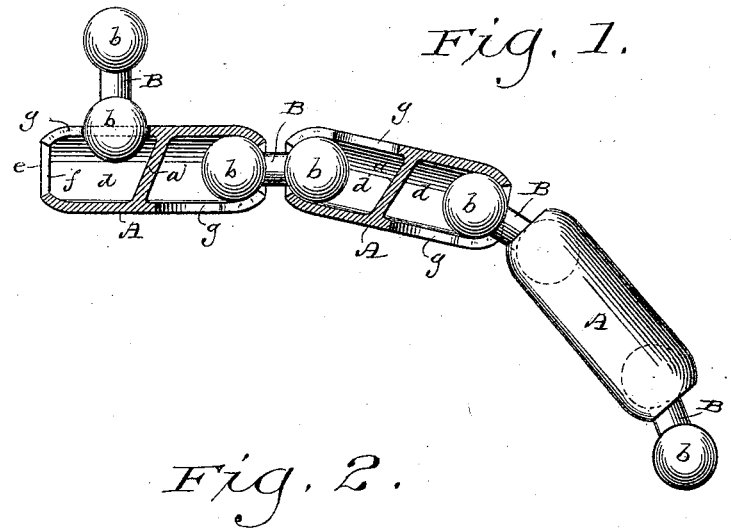
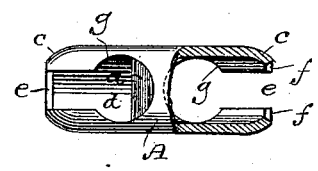
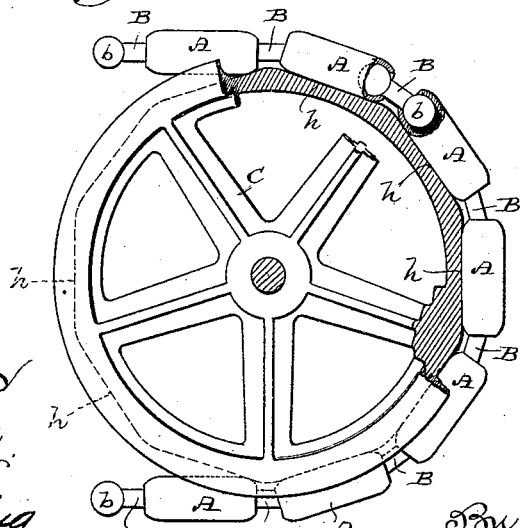
Witnesses
Geo. W. Young
Wm. Klug
Inventor
Oliver P. Hurford.
By H. G. Underwood
Attorney

UNITED STATES PATENT OFFICE.

OLIVER P. HURFORD, OF CHICAGO, ILLINOIS.

DRIVE-CHAIN.

SPECIFICATION forming part of Letters Patent No. 443,769, dated December 30, 1890.

Application filed July 15, 1890. Serial No. 358,869. (No model.)

*To all whom it may concern:*

Be it known that I, OLIVER P. HURFORD, of Chicago, in the county of Cook, and in the State of Illinois, have invented certain new and useful Improvements in Drive-Chains; and I do hereby declare that the following is a full, clear, and exact description thereof.

My invention relates to drive-chains; and it consists in certain peculiarities of construction, as will be fully set forth hereinafter, and subsequently claimed.

In the drawings, Figure 1 a is plan view, partly in section, of my improved device. Fig. 2 is a plan view, partly broken away, of a detached link thereof. Fig. 3 illustrates one use of my improved device.

A A A represent the socket-links of my improved chain, said links being hollow, with a preferably diagonal or oblique central interior strengthening-web $a$. Each end of the links A is contracted, as shown at $c\ c$, and provided with an opening $e$, (having preferably beveled walls $f$,) and having a generally rounded interior surface $d$, adjacent to each opening $e$, to form a socket for the reception of one of the balls $b$ of the ball-links B B B, (there being one of these balls $b$ at each end of each ball-link B,) and which balls are admitted to place within the described sockets $d$ of the links A by means of the key-hole slots $g$, formed in the opposite sides of the said links A, the narrow parts of these slots $g$ extending to the ends of the said links and merging with the described end openings $e$.
By means of this described construction of chain the strain is distributed throughout the links evenly, while at the same time great flexibility is derived from the described placing of the key-hole slots $g$ on opposing sides of the links A.

It is obvious that if a pulley of very small diameter is to be employed I may proportionally reduce the length of the socket-links A to correspond. Again, when I wish to obtain the advantages of a sprocket-wheel with my chain I have only to employ a polygonal-faced wheel or pulley C, such as is shown in Fig. 3, the faces $h\ h$ thereof corresponding in length to the length of the socket-links A A of my chain to accomplish the desired result.

Among the chief advantages of my improved chain is the feature of adaptability to run in any direction, which enables my device to be employed in situations where, from the relative arrangement of the pulleys, for instance, ordinary drive-chains cannot be used, and it further obviates the objection incident to hemp or similar ropes of stretching, (from their inherent elasticity, strain, centrifugal motion, or other causes,) while at the same time my chain can run in ordinary grooves like fibrous ropes, and hence does away with the disadvantage of a comparatively low rate of speed inseparable from the use of ordinary sprocket-wheels and chains, and as my improved chain is flexible, but not capable of extension under strain, all necessity for the use of take-up or tightening devices common to rope and belt transmissions is obviated, while at the same time this improved chain is always enabled to exert the full force of the pull on the object to which the said chain is attached or around which it may be placed.

Having thus described my invention, what I claim as new, and desire to secure by Letters Patent, is—

A flexible chain comprising a series of socket-links having key-hole slots on the opposing sides thereof merging in openings in the ends thereof, with an independent series of links having balls at each end thereof adapted for engagement within the sockets of the said socket-links.

In testimony that I claim the foregoing I have hereunto set my hand at Chicago, in the county of Cook and State of Illinois, in the presence of two witnesses.

OLIVER P. HURFORD.

Witnesses:
 ALEX. H. GUNN,
 H. G. UNDERWOOD.